July 15, 1930. H. FORD 1,770,468
ENGINE STARTER AND GENERATOR GEARING
Filed Feb. 4, 1929   3 Sheets-Sheet 1

INVENTOR
Henry Ford.
BY C. R. Halbert,
E. L. Davis.
ATTORNEYS.

July 15, 1930.   H. FORD   1,770,468
ENGINE STARTER AND GENERATOR GEARING
Filed Feb. 4, 1929   3 Sheets-Sheet 2

INVENTOR
Henry Ford,
BY C. R. Halbert.
E. R. Davis.
ATTORNEYS.

July 15, 1930.   H. FORD   1,770,468
ENGINE STARTER AND GENERATOR GEARING
Filed Feb. 4, 1929   3 Sheets-Sheet 3

INVENTOR
Henry Ford.
BY C. R. Halbert.
E. L. Davis.
ATTORNEYS.

Patented July 15, 1930

1,770,468

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

ENGINE STARTER AND GENERATOR GEARING

Application filed February 4, 1929. Serial No. 337,212.

The object of my invention is to provide an engine starting mechanism of simple, durable and inexpensive construction.

Still a further object of my invention is to provide an engine starting mechanism which will connect the armature of an electric starting motor with the crank shaft of the engine thru a reduced gear ratio when the starting motor is driving; and which will connect the same armature with the same crank shaft when the crank shaft is driving, thru a direct drive so as to drive the crank shaft and the armature at the same speed.

A further object of my invention is to provide an improved mechanical gear reduction for use with a starter generator unit ordinarily associated with an automobile engine.

In the past, combined starting and generating units have been made so that when current is fed to the unit will drive the engine and when the engine is driving the unit it will act as a generator to charge the battery associated therewith. It has always been a rather comparatively simple matter to design the starting generating unit so that it would function both as a starter and a generator but the problem has been a devise a suitable connection between this unit and the engine which would combine a suitable reduction when the unit was driving the engine with a direct drive when the engine was driving the unit. It is of course necessary to have this reduction gearing because a starting motor of sufficient torque to crank the engine with no reduction is not a commercial possibility. Further, if the unit were to be connected with the engine at all times thru a reduction gearing, the excessive speed obtained by this unit when the engine was operating under its own power would be so great that it would undoubtedly ruin the unit very shortly.

Still a further object of my invention is to provide a gearing which will automatically connect a starting generating unit to an engine with a 21 to 1 ratio at all times when the engine is not operating under its own power, and which will automatically disengage itself and connect the engine to the unit with a 1 to 1 ratio when the engine is operating under its own power. In some of the present day starting units, the action of the starting motor is utilized to throw the starting reduction gearing into engagement with the engine. This method is extremely noisy due to the sudden application of the load. All noise is overcome in the applicant's device because the reduction gearing connects the starting unit and the engine at all times, except the period in which the engine is actually operating under its own power. The gearing is not thrown in when the starter is used because the gearing is already in mesh.

Still a further object of my invention is to provide a starter driving gear which will not depend upon the inertia of the gears or the acceleration of the starting motor to throw the gearing into mesh.

In a well known type of starting reduction gearing, the acceleration of the starting motor is used in combination with the inertia of the driving gear to throw the driving gear into engagement with the engine. Considerable trouble arises with this device if the acceleration of the starting motor is not extremely fast. Further, if the starting gear does not engage when the starting motor is first connected, the starting motor must be allowed to come to a standstill and the operation repeated until the inertia is sufficient to throw the gearing into engagement. In the applicant's device the acceleration of the starting motor or the inertia of the parts have no effect whatever upon the operation of the device. The applicant's starting motor being connected with the engine, even when both are still, starting is accomplished without the jerk and noise that is customary when a speedily revolving armature shaft is thrown into positive connection with a stationary engine.

Still a further object of my invention is to provide a starting reduction gearing of novel design and which consists of only one internal gear, one planet gear, an eccentric drive shaft, and means for restraining the planet gear from rotation when the drive shaft is rotated.

Still a further object of my invention is to provide a starting generating gearing which will be extremely quiet when used as a starting gearing and in which no gears will operate when used as a generator drive to thereby secure silent operation of the generator.

Still a further object of my invention is to provide a starting generating gearing which will have ball or roller bearings therein and which will operate continuously in an oil bath to insure quiet operation and lasting service. In the conventional two unit starting mechanism it is almost impossible to provide an oil bath for the starter reduction gearing. This starting reduction gearing is the only exposed unlubricated gearing which is used on present day automobiles. The two unit starting and generating system has a further disadvantage in that this system costs considerably more than the single unit, as two armatures, two field rings, and two housings must be provided instead of only one each as in the single unit system.

Still a further object of my invention is to provide a starting generating gearing which may be conveniently mounted on the engine crank shaft either inside of the pulley which is used to drive the fan associated with the engine, or inside the starting and generator armature.

Still a further object of my invention is to provide a starting and generating unit which may be aligned with the crank shaft of an engine and which may be mounted forwardly of the engine and to provide means extending thru the starting generating unit so that the engine may be manually cranked if desired.

With these and other objects in view my invention consists in the arrangement, construction and combination of the various parts of my improved device, as described in the specification, claimed in the claims, and illustrated in the accompanying drawings, in which:

Figure 1:
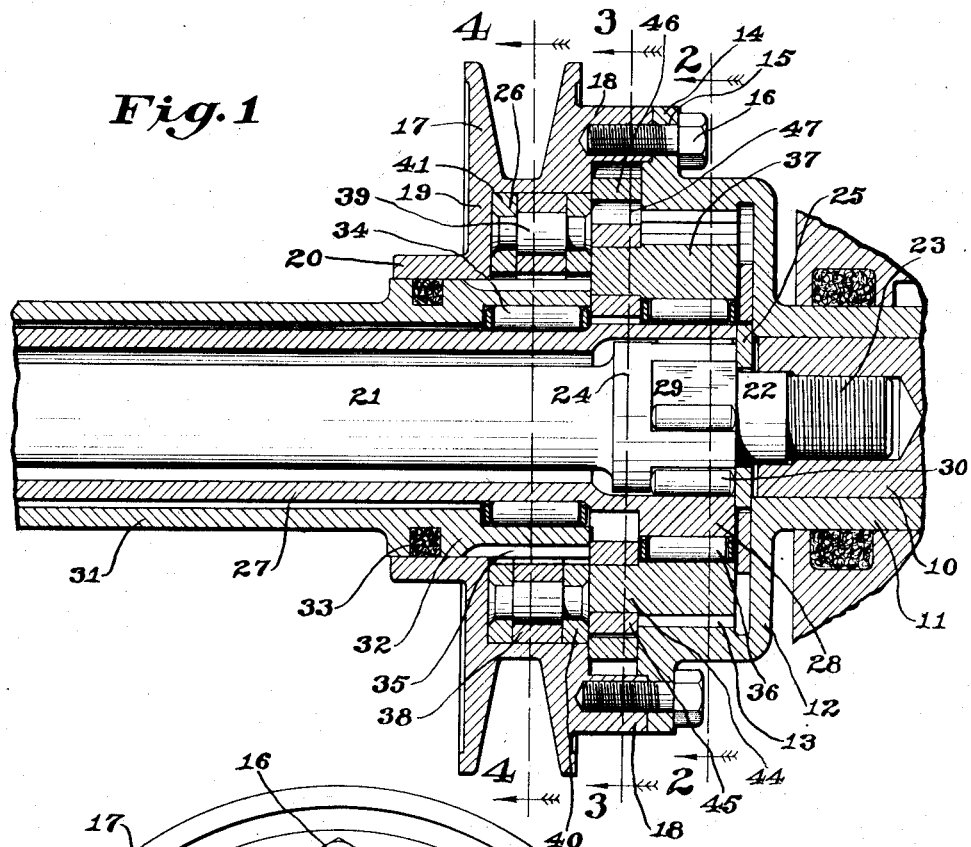
Figure 1 shows a central, vertical, sectional view through a crank shaft and fan drive pulley having my improved device installed therein.

Referring to the accompanying drawings, I have used the reference numeral 10 to indicate generally the front end of the crank shaft of an automobile engine. An internal gear hub 11 is suitably splined or otherwise fastened upon the forward end of this crank shaft 10 and has a radial flange 12 extending from the forward edge thereof. An internal gear 13 projects forwardly from the outer edge of the flange 12 and a second radial flange 14 extends radially from the forward edge of the internal gear 13 and is provided with suitable openings 15 through which bolts 16 may be inserted.

A lower fan belt pulley 17, of the V type construction, is provided with a rearwardly extending flange 18 which is secured to the flange 14 by the bolts 16. The interior portion of the pulley 17 is hollow to provide for part of the mechanism to be described later. The pulley 17 has a solid forward wall 19 which is cast integrally with the forward bearing sleeve 20.

Briefly, the internal gear 13 is securely fastened to the forward end of the crank shaft; and the fan pulley 17 is secured to the forward edge of this internal gear, the bearing sleeve 20 forming the bearing for the forward edge of the fan pulley. A housing of considerable size is thereby formed inside of this internal gear and fan pulley in which my improved starting mechanism is mounted.

A manual starting shaft 21 extends forwardly from the crank shaft 10 and is permanently connected thereto by means of an extension 22 of the shaft 21 co-acting with a suitably threaded opening 23 in the forward end of the crank shaft 10. The shaft 21 is provided with an enlarged portion adjacent to the crank shaft, the purpose of this enlarged portion 24 being to house a suitable roller clutch and to form a shoulder for securing the internal gear 13 onto the shaft 10 by means of the washer 25. The forward end of shaft 21 is provided with a means for mounting a suitable starting crank thereon so that the crank shaft may be rotated manually if desired.

The shaft 21, the crank shaft 10, the internal gear 13, and the fan pulley 17 are always rotated as a unit with no rotation relative to each other.

A sleeve 27 surrounds the shaft 21 and is provided at the end adjacent to the crank shaft with an eccentric 28. The forward end of the sleeve 27 is connected directly with the armature of the starting unit. The sleeve 27 and eccentric 28 may be considered as a permanent part of the armature. The enlarged portion 24 of shaft 21 is provided with a plurality of notches 29, each notch having a roller 30 therein.

The eccentric 28 is provided with a suitable bore, adjacent to the portion 24 and concentric with the sleeve 27, so that when the crank shaft is rotating in a counter-clockwise direction, looking from the rear end forward, the rollers 30 will co-act with the enlarged bore in the eccentric 28 and thereby drive the sleeve 27, the eccentric 28, and the crank shaft 10, as a unit. The above mentioned direction of rotation is the normal operating direction for an automobile engine.

The purpose of the roller clutch 30 is to drive the armature shaft directly therethrough when the crank shaft 10 rotates faster under its own power than the armature sleeve 27 is being driven by the starting motor. It is this clutch 30 which drives the armature as a generator when the motor is under normal operation.

A stationary sleeve 31 is disposed around sleeve 27 and is preferably secured at its forward end to the front frame cross member (not shown). The rear end of the stationary sleeve 31 is provided with an enlarged portion 32 which contains a packing ring 33. This portion 32 is bored out to receive a roller bearing 34, which supports the rear end of the sleeve 27.

The exterior surface of portion 32 of the stationary sleeve 31 is provided with a number of ratchet teeth 35 which co-act with suitable dogs to be described later. It should be kept in mind that the sleeve 31 and the ratchet teeth 35, are always stationary and is used as a fulcrum against which the planet reduction gearing bears when the starting motor is driven to start the engine. The sleeve 31 also forms a rear bearing support for the rear end of the armature driving sleeve 27 and the eccentric 28. Further, an oil seal is formed by means of the felt 33 co-acting with the pulley sleeve 20 to retain lubricant in the pulley housing.

The eccentric 28 has a roller bearing assembly 36 mounted thereon and a planet gear 37 is rotatably mounted on this eccentric 28 by means of this roller assembly and is in constant mesh with one section of the internal gear 13. There is no positive rotary driving connection between the eccentric 28 and the planet gear 37. When the shaft 27 is driven by the motor armature, the eccentric 28 rotates with it and oscillates the planet gear 37 due to the crank action of the eccentric but does not actually rotate the gear. In fact, other means are provided in this device so that the gear 37 will be restrained from rotation but will be allowed to oscillate when the device is used as a starter.

Figure 2:
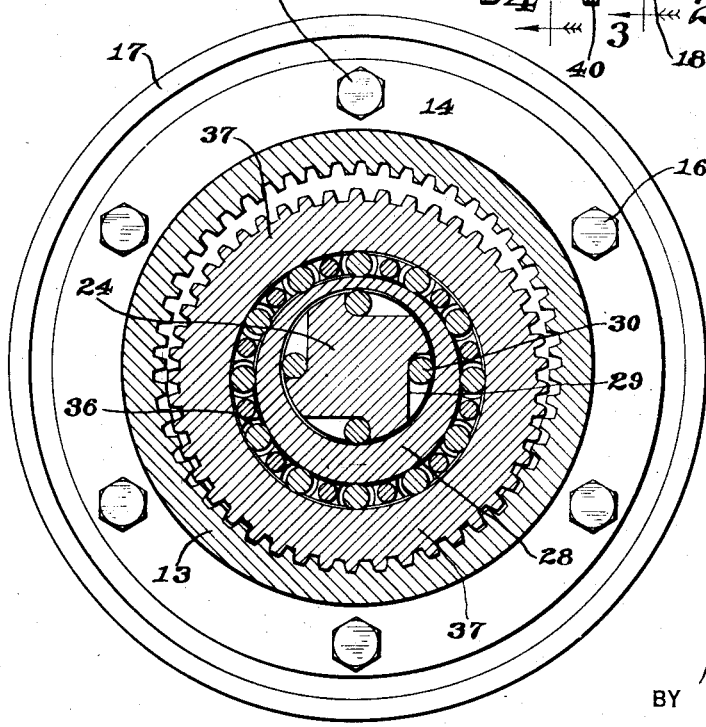
Figure 2 shows a sectional view taken on the line 2—2 of Figure 1.

This can be clearly followed from Figure 2 where the rotation of the eccentric 28 will oscillate the center of the planet gear 37, so that the point of mesh between the planet gear 37 and the internal gear 13 will progress around the internal gear and always be at that point on the internal gear adjacent to the throw of the eccentric 28.

Referring to Figure 2, if the eccentric 28 were rotated counterclockwise, according to this view, and the internal gear were held stationary then the planet gear 37 would rotate slowly or at a much reduced speed in a clockwise direction. The ratio of this reduction would be as the difference between the number of teeth in the planet gear and the internal gear is to the total number of teeth in the planet gear. If the internal gear has 42 teeth and the planet gear has 40 teeth, the difference will be 2 teeth and the ratio will be as 2 is to 42 or 1 to 21, that is, the planet gear will progress 1/21 of a revolution backward for each forward revolution of the eccentric 28.

It has been previously stated that the planet gear 37 is not allowed to rotate but is only free to oscillate. It is immaterial whether the planet gear is allowed to rotate slowly in a clockwise direction and the internal gear held stationary, or whether, as the applicant has chosen in this case, the planet gear is held from rotation and the internal gear advanced slowly in the opposite or counter-clockwise direction. The method of calculation and operation in each of the above cases are identical and the reason the planet gear has been chosen as the stationary member is that it seems to make a better design.

The following means are provided for allowing the gear 37 to oscillate but restraining it from rotation. This term "restraining it from rotation" is meant to apply only to that time when the device is used as a starting reduction gearing. When the device is used for driving the generator, the gear 37 is allowed to rotate as a unit with the other parts, as at that time the internal gear 13, the gear 37, the fan pulley 17 and ratchet device all rotate as a unit.

The starting ratchet assembly is composed of the ratchet pawls 38 which are conventionally mounted on pins 39, the latter being secured at each end in ring members 26 and 40, respectively. The ratchet assembly, which I have termed 41, is rotatably mounted in the space within the pulley member 17 and the ratchet pawls 38 are disposed so that they may co-act with the ratchet notches 35 in the rear end of the stationary sleeve 31. The rear ratchet ring 40 is provided with a pair of diametrically opposed driving pins 42 extending rearwardly from its rear face. A pair of rollers 43 are rotatably mounted on these pins 42.

A pair of diametrically opposed pins 44, similar to the driving pins 42, are formed integrally with the forward face of planet gear 37 and extend forwardly therefrom. A pair of rollers 45 are rotatably mounted on these pins 44.

Figure 3:
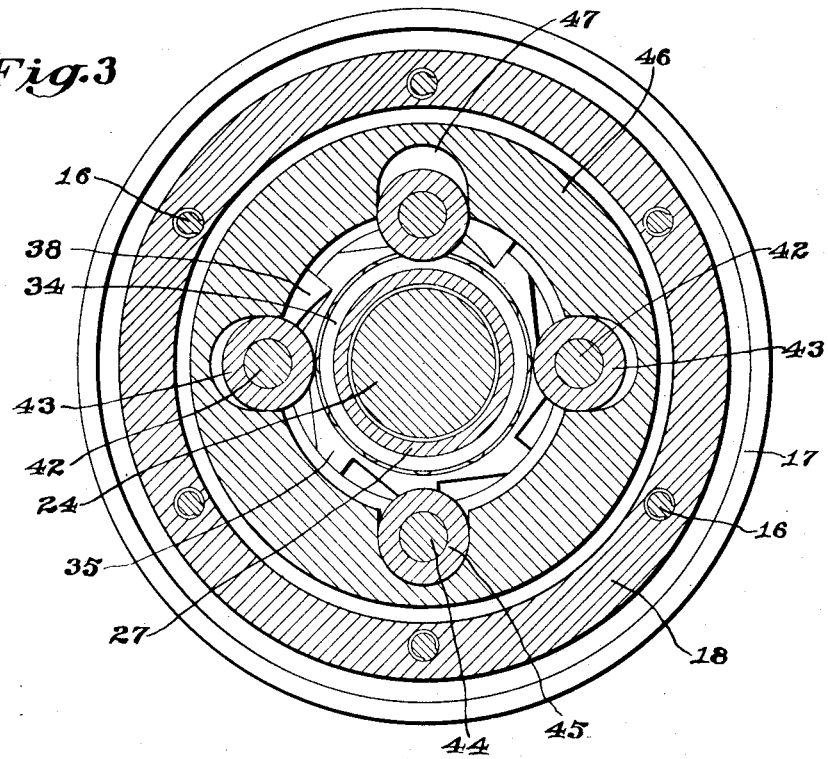
Figure 3 shows a sectional view taken on the line 3—3 of Figure 1.

The applicant's means for connecting the oscillating planet gear 37 with the stationary ratchet ring assembly 41 is shown in Figure 3. The ring member 46 is mounted in the space within the sleeve 18 between the forward edge of the internal gear 13 and the rear edge of the pulley 17 and is not only mounted so as to be free to rotate but the opening or the bore in the sleeve 18 is larger than the outside diameter of the ring by an amount equal to the throw of the eccentric 28. The reason for this clearance will be given later.

The ring 46 is provided with four radial slots 47 extending from its inner bore a considerable distance towards the outside of the ring. These slots are equally spaced and at right angles with each other and are of just the correct width to accommodate the rollers 43 and 45. The pair of rollers 43 extending from the rear edge of the ratchet assembly are disposed in two opposite slots and the remaining two rollers extending forwardly from the planet gear 37 are disposed in the two remaining slots. A positive connection is thereby secured between the planet gear 37 and the ratchet assembly 41, and for purposes of rotation may be considered as a unit at all times.

Referring to Figure 3, if the ratchet mechanism 41 is held stationary, pin 42 and rollers 43 will also be held stationary and the ring 46 will be held from rotating. This ring 46 will also be held from vertical movement but will be allowed a certain amount of transverse movement due to the slots being of a sufficient depth. The pins 44 on the planet gear are concentric with the gear proper but are not, of course, concentric with the ring 46 or the ratchet assembly 41 because the center of the gear 37 is thrown off by the eccentric 28. The pins 44, therefore, must displace themselves in the remaining slots toward one side of the ring to the amount of eccentricity of the eccentric 28.

As the eccentric 28 rotates clockwise, from the position shown in Figure 2, through 90 degrees, the axis of planet gear 37 is displaced to the right side of the vertical center line of the device by an amount equal to the eccentricity of the eccentric. This displacement of the gear 37 carries the ring 46 sidewise with it which is allowed by the clearance between the ends of the slots and the rollers 43. A further rotation of the eccentric through 90 degrees, returns the ring to its former position and the rollers 45 are raised to the upper position in their respective slots. A further rotation of the eccentric to complete the revolution only repeats this movement but to the left side of the device and returns the rollers 45 to their starting positions.

Figure 4:
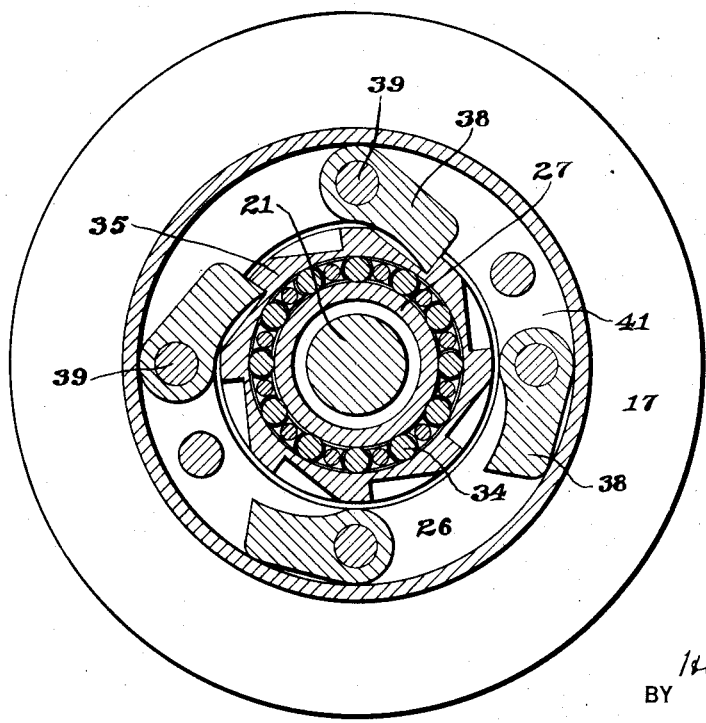
Figure 4 shows a sectional view taken on the line 4—4 of Figure 1.

From the foregoing it may be seen, that the planet gear 37 is free at all times for oscillation of its center by the eccentric 28 but is restricted at all times from rotary movement relative to the ratchet assembly 41; and that the ratchet assembly 41 is restricted from movement in a clockwise direction, referring to Figure 4, by the action of the pawls 38 co-acting with the ratchet teeth 35 on the stationary sleeve member 31. The gear 37 is not restricted from movement in the opposite or counter clockwise direction because the pawls 38 only restrict movement in one direction and may be rotated freely in the opposite direction.

It may also be seen that when the ratchet assembly 41 is rotating in a counter clockwise direction, the ratchet pawls will become loosened or disengaged from the notches 35 and the centrifugal force on these pawls will throw them to the outer edge of the space within the pulley member 17 and will keep them from dropping against the ratchet notches 35 as long as the assembly is continued in motion.

The operation of this device is quite simple and practically no difficulty is encountered in making a very efficient job.

When the motor armature is fed current so as to operate it as a starting motor, the sleeve 27 rotates the eccentric 28 which oscillates the planet gear 37. This planet gear 37 is held from rotation by the action of the ring member 46 and the ratchet assembly member 41 co-acting with the stationary member 31 through the ratchet teeth 35. As the planet gear 37 is not allowed to rotate in a clockwise direction, looking from the rear forward, the internal gear will be forced to rotate at a reduced speed in a counter-clockwise direction.

This rotation of the internal gear 13 turns the crank shaft of the engine and as soon as the crank shaft operates under its own power the rollers 30 take hold of the eccentric end of the armature shaft 27 and drive this shaft at crank shaft speed. When these rollers are engaged the internal gear 13 and the eccentric 28 are rotating uniformly and so the planet gear 37 ceases to move in relation to these members but rotates as a unit with these parts.

The ring 46 and ratchet assembly 41 being permanently connected to the gear 37 rotate with it so that there is no relative movement at this time between the pulley 17, ratchet assembly 41, ring 46, internal gear 13, planet gear 37, shaft 21, armature shaft 27 and the crank shaft 10. The ratchet ring 40 and stationary shaft 31, of course, do not rotate but the roller bearing 34 effectively prevents friction between this member and the rotating parts of the device.

The device now operates the motor generator unit as a generator at crank shaft speed and continues to do so until the engine is stopped. The ratchet pawls 38 being held by centrifugal force in their outward positions do not in any way co-act with the ratchet 40 until the engine is stopped. When this occurs one or more of the pawls 38 drop into the adjacent notch 35 of the ratchet member and remain in this position until it is desired to start the engine again.

The engaging of the pawls 38 throws in the starting gearing and when it is desired to start the engine there are no further means to be thrown in, either by the inertia of the parts or by the acceleration of the motor. No manual shifting whatever is required to be done with this device and nothing more than a switch in the starting motor circuit is needed to operate it.

Figure 5:
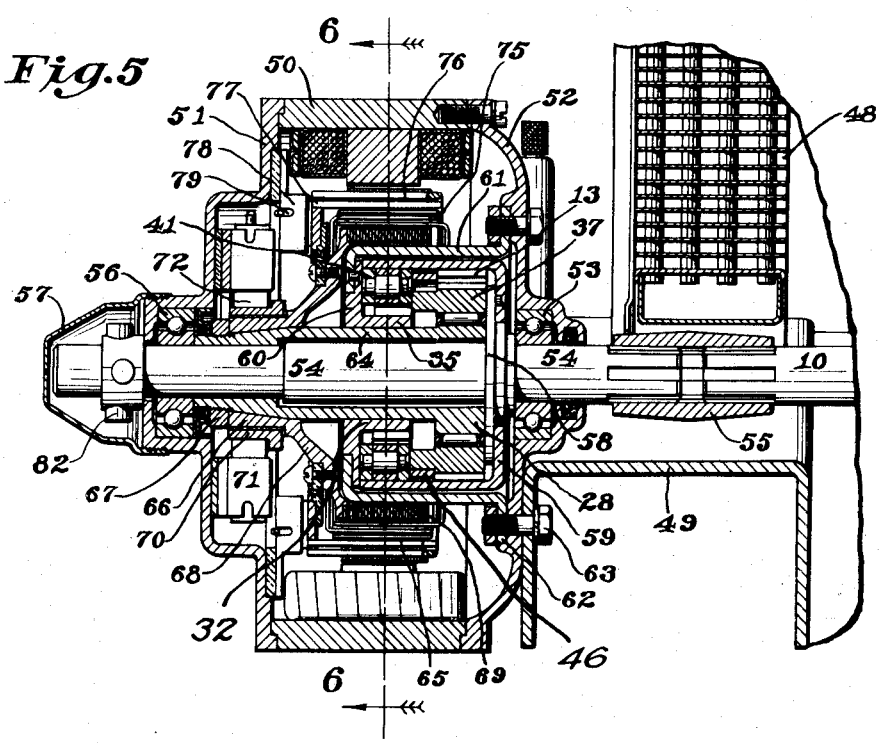
Figure 5 shows a vertical, central, sectional view through a starting and generating unit having my improved device installed therein.

Referring to Figure 5, a motor generator unit is shown having the applicant's drive gearing mounted inside of the armature of this unit, making a very compact and efficient outfit. The various parts, which are the same or have the same function as those parts shown in Figure 1, have been given the same numerals to simplify the description and operation of the device.

The engine radiator 48 is mounted on the front frame cross member 49 and a starting generating unit is mounted on the forward side of this member. This unit has a field ring 50 and front and rear cover plates 51 and 52, respectively. The rear cover plate 52 is suitably secured to the front of the cross member 49 and is provided with a ball bearing 53 in which a crank shaft extension 54 is rotatably mounted. For convenience in assembly, the extension 54 is connected to the forward end of the crank shaft 10 by a splined sleeve 55 which drives the extension 54 at all times with the crank shaft 10.

The extension shaft 54 extends through the motor generator unit and is rotatably mounted in the forward cover plate 51 by a ball bearing 56. The forward end of shaft 54, which is the equivalent of shaft 21 Figure 1, is likewise provided with suitable means, for manual rotation. A protecting cap 57 encloses this end of the shaft and gives the device a pleasing appearance.

The portion of shaft 54 forwardly of and adjacent to the rear cover plate 51 is provided with a radial flange 58 to which a cup shaped member 59 is secured. This cup member is provided with internal teeth 13 and extends forwardly in position to house the ratchet assembly 41. The stationary notched member 32 is provided with a radial flange on its forward edge which is secured by rivets to a stationary sleeve 61 and to the rear cover plate 52 by means of the flange 62 and screws 63. The notched member 32 is always held stationary by means of sleeve 61 and cover plate 51.

The crank shaft extension 54 is provided with an internal gear 13 which is driven at all times with the crank shaft.

The notched member 32 is provided with a suitable bore to receive the armature driving sleeve 64. This armature driving sleeve is rotatably mounted at its forward end on the shaft 54 end extends from the rear face of the ball bearing 56 to the flange 58 on the shaft 54. An eccentric 28 is formed on the rear end of the sleeve 64 and is very similar to the construction shown in Figure 1.

The armature proper 65 is constructed bell shaped, having a sleeve 66 secured to the forward end of the sleeve 64 by means of a taper and spanner nut 67. A conical flange 68 extends outwardly and rearwardly from the rear end of the sleeve 66 and is provided at its outer edge with a ring shaped armature lamination assembly 69 which extends rearwardly therefrom. A commutator assembly 70 is mounted on the exterior face of the sleeve 66 and a suitable brush ring 71, having brushes 72, is mounted on the forward side of the rear cover plate 51 in position to co-act with this commutator assembly.

The armature lamination ring 69 is provided with a generator winding and also a starting motor winding. The generator winding 75 is suitably connected to the commutator 70 so that when the armature unit is rotated current will be generated in these windings as in the ordinary generator. The starting motor winding 76 is connected to a second commutator assembly 77 which is insulated from and mounted on the forward edge of the flange 68. A starter brush ring 78 having starting brushes 79 secured therein is mounted on the forward wall of cover plate 51 and in position to co-act with the starter commutator 77. Both brush rings 71 and 78 are mounted on cover plate 51 but are not connected electrically in any way.

This arrangement of starting and generator windings and collecting members forms no part of my invention but merely illustrates a method by which the device may be operated. Any type of starting and generating unit wherein the driving shaft rotated by the starting motor is also driven by the engine to generate current, is applicable to my invention. The bell shaped armature design, however, is particularly suitable to house the gearing and for this reason is here shown.

The gearing shown in Figure 5 is with one exception identical to that shown in Figure 1. In Figure 1 the generator driving rollers 30 are used to connect the shaft 21 with the armature sleeve 27 to drive the latter as a generator drive; while in Figure 5 a similar roller clutch is used but it is placed between two different elements to accomplish this drive. This method is shown as an alternate construction and it is intended that either type of drive may be used in either installation.

Figure 6:
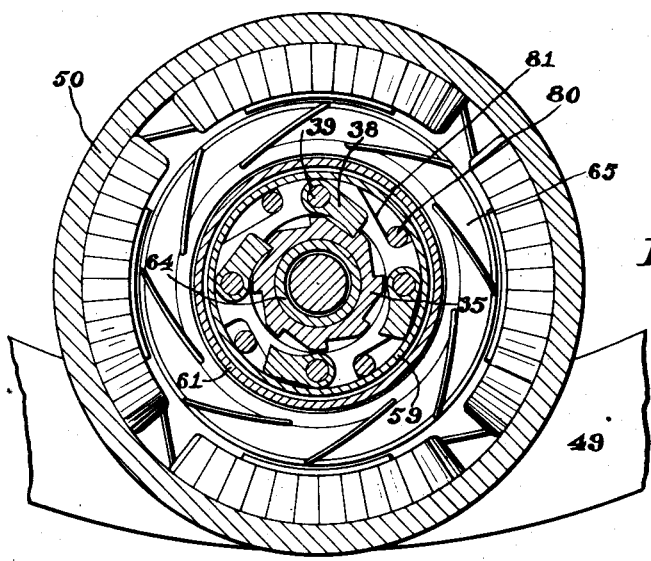
Figure 6 shows a sectional view taken on the line 6—6 of Figure 5.

Referring to Figure 6, the ratchet assembly 41 is provided with a plurality of clutch rollers 80 which are retained in suitable notches 81 machined in the exterior edges of this ratchet assembly. The purpose of this device is to connect the ratchet assembly 41 with the cup member 59 when the engine is operating under its own power.

The eccentric gear 37, ring 46 and ratchet assembly 41 are secured together by exactly the same method as used in Figure 1 and in fact the whole operation of the device is practically identical. When the current is fed to the starter windings of the armature, the driving shaft 64 is rotated which rotates the eccentric 28 and oscillates the gear 37. The gear 37 is held from rotation by the ring 46 and ratchet member 41 co-acting with the ratchet notches 35 which are held stationary by the sleeve 61 and cover pate 51. The oscilation of a planet gear 37 rotates the internal gear 13 and the shaft 54 in the same direction that the armature is travelling but at the reduced speed of the starting gearing.

The direct drive which causes the unit to act as a generator is as follows: When the crank shaft 10 begins to run under its own power, the internal gear is driven direct from the crank shaft 10 through the flange 58 and cup shaped member 59. The clutch rollers 80 lock the ratchet assembly to the member 59 so that the ratchet assembly rotates with the crank shaft and internal gear. The planet gear is caused to also rotate with the ratchet assembly by the pins 42 and rollers 43. As the planet gear is held from rotation relative to the internal gear, it can no longer oscillate in the internal gear and change the place at which it meshes with the internal gear. The eccentric 28 must therefore rotate with the remaining parts of the drive so that the armature sleeve 64 and armature will be rotated at crank shaft speed.

Many advantages arise through the use of my improved device. I have secured a novel reduction gearing which may be amply lubricated and which will be extremely quiet when used as a starting reduction gearing and also one in which no wear or movement of parts will occur when the device is used as a generator drive. Further, I have secured a gearing which will automatically connect the motor generator unit with the engine and does not depend upon the acceleration of the starting motor or the inertia of any part to throw the gearing into operation.

A further advantage results because the generator is positively driven when the engine is operating under its own power and no manual shift whatever is required to accomplish this action. When it is desired to turn the crank shaft manually, the shaft 21 may be rotated with a crank connected at 82 independently of the starting motor. And further, the drive gearing may be mounted within the starting generating unit or may if desired be mounted in the fan pulley housing to secure a very compact outfit.

Some changes may be made in the arrangement and construction of the various parts of my improved device without departing from the spirit of my invention, and it is my intention to cover by my claims such changes as may reasonably be included within the scope thereof.

I claim as my invention:

1. In a starter generator unit, a driven shaft rotatably mounted therein, an armature shaft rotatably mounted on said driven shaft, a bell shaped armature secured to said armature shaft at one end thereof, and a reduction gearing disposed within the lines of said armature for connecting said armature shaft with said driven shaft.

2. In a starter generator unit, a driven shaft rotatably mounted therein, an armature shaft rotatably mounted on said driven shaft, a bell shaped armature secured to said armature shaft at one end thereof, an eccentric formed on the opposite end of said armature shaft, an internal gear secured to said driven shaft, a planet gear rotatably mounted on said eccentric and in mesh with one portion of said internal gear, means for holding said planet gear from rotation, said means allowing said planet gear to oscillate, the gearing being all disposed within the lines of said bell shaped armature.

January 30, 1929.

HENRY FORD.